(12) United States Patent
Matsuda et al.

(10) Patent No.: US 10,423,113 B2
(45) Date of Patent: Sep. 24, 2019

(54) DRIVING FORCE TRANSMISSION DEVICE AND IMAGE FORMING APPARATUS

(71) Applicant: FUJI XEROX CO., LTD., Tokyo (JP)

(72) Inventors: Takanari Matsuda, Yokohama (JP); Chigusa Oishi, Yokohama (JP); Keiji Sasaki, Yokohama (JP)

(73) Assignee: FUJI XEROX CO., LTD., Tokyo (JP)

( * ) Notice: Subject to any disclaimer, the term of this patent is extended or adjusted under 35 U.S.C. 154(b) by 335 days.

(21) Appl. No.: 15/233,569

(22) Filed: Aug. 10, 2016

(65) Prior Publication Data

US 2017/0205753 A1 Jul. 20, 2017

(30) Foreign Application Priority Data

Jan. 15, 2016 (JP) ................................. 2016-006062

(51) Int. Cl.
*F16H 57/08* (2006.01)
*G03G 15/00* (2006.01)
*F16H 1/28* (2006.01)
*F16H 1/46* (2006.01)

(52) U.S. Cl.
CPC ............. *G03G 15/757* (2013.01); *F16H 1/28* (2013.01); *F16H 1/46* (2013.01); *F16H 2001/289* (2013.01)

(58) Field of Classification Search
CPC .................................................... F16H 57/082
See application file for complete search history.

(56) References Cited

U.S. PATENT DOCUMENTS

| 4,756,212 A | * | 7/1988 | Fuehrer ............... F16H 57/0479 475/159 |
| 5,336,136 A | * | 8/1994 | Jacqui ....................... E06B 9/72 475/275 |
| 8,523,730 B2 | * | 9/2013 | Miyawaki .......... G03G 15/1615 475/331 |
| 2014/0011621 A1 | * | 1/2014 | Steckel ................... B25B 21/00 475/149 |
| 2014/0135166 A1 | * | 5/2014 | Wang ........................ F16H 1/46 475/337 |

FOREIGN PATENT DOCUMENTS

| JP | 2012092907 A | * 5/2012 | ............... F16H 1/46 |
| JP | 2015-081638 A | 4/2015 | |

OTHER PUBLICATIONS

JP2012092907A Machine Translation filed Jul. 22, 2018 (Year: 2018).*

* cited by examiner

*Primary Examiner* — Tisha D Lewis
(74) *Attorney, Agent, or Firm* — Oliff PLC

(57) ABSTRACT

A driving force transmission device includes a sun gear that rotates upon receipt of a driving force, an internal gear that has a hollow portion and internal teeth on an inner surface of the hollow portion, the internal gear being disposed coaxially with the sun gear, a planetary gear that rotates and revolves in mesh with the sun gear and the internal gear, a rotating member that supports a rotating shaft of the planetary gear, and rotates about an output shaft as the planetary gear revolves, and a retaining member that contacts with one end of the rotating shaft of the planetary gear on one surface side of the rotating member to retain the rotating shaft.

11 Claims, 12 Drawing Sheets

DRIVING FORCE TRANSMISSION DEVICE AND IMAGE FORMING APPARATUS

CROSS-REFERENCE TO RELATED APPLICATIONS

This application is based on and claims priority under 35 U.S.C. 119 from Japanese Patent Application No. 2016-006062 filed Jan. 15, 2016.

TECHNICAL FIELD

The present invention relates to a driving force transmission device and an image forming apparatus.

SUMMARY

According to an aspect of the present invention, a driving force transmission device includes a sun gear that rotates upon receipt of a driving force, an internal gear that has a hollow portion and internal teeth on an inner surface of the hollow portion, the internal gear being disposed coaxially with the sun gear, a planetary gear that rotates and revolves in mesh with the sun gear and the internal gear, a rotating member that supports a rotating shaft of the planetary gear, and rotates about an output shaft as the planetary gear revolves, and a retaining member that contacts with one end of the rotating shaft of the planetary gear on one surface side of the rotating member to retain the rotating shaft.

BRIEF DESCRIPTION OF THE DRAWINGS

Exemplary embodiments of the present invention will be described in detail based on the following figures, wherein.

DETAILED DESCRIPTION

Hereinafter, exemplary embodiments and specific examples of the present invention will be described in detail with reference to the drawings. However, the present invention is not limited to the exemplary embodiments and the specific examples.

The drawings are schematic, and it should be noted that a ratio of dimensions and the like are different from actual embodiments, and portions that are not necessary for the description may be omitted from the drawings for easy understanding.

(1) Overall Configuration and Operations of Image Forming Apparatus

Figure 1:
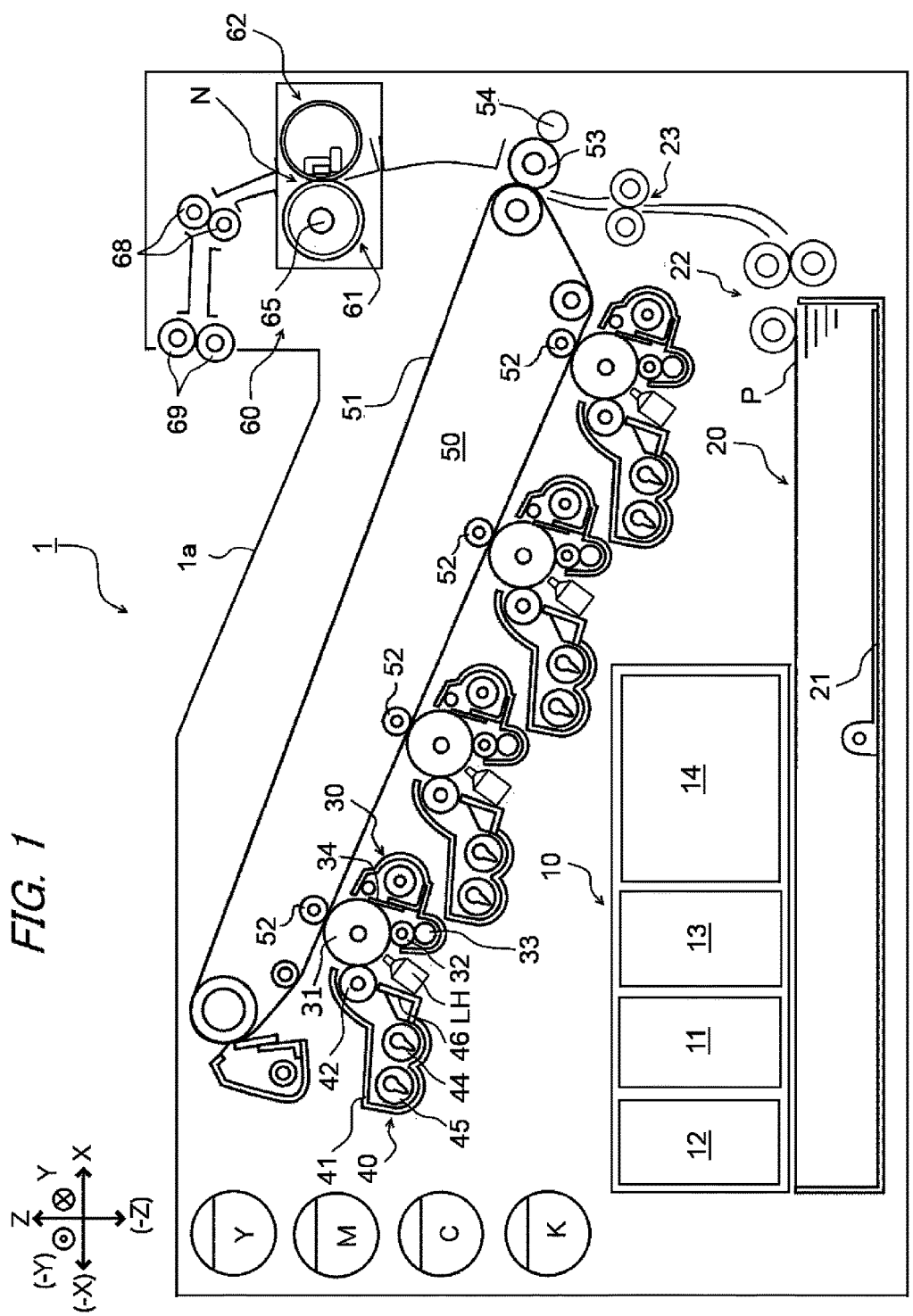
FIG. 1 is a schematic sectional view illustrating an internal configuration of an image forming apparatus 1.

FIG. 1 is a schematic sectional view illustrating an internal configuration of an image forming apparatus 1 according to the exemplary embodiment.

Hereinafter, the entire configuration and the operation of the image forming apparatus 1 will be described with reference to the drawings.

The image forming apparatus 1 includes a control device 10, a sheet feeding device 20, a photoreceptor member unit 30, a developing unit 40, a transfer unit 50, and a fixing device 60. An output tray 1a which outputs and accommodates a paper sheet on which an image is recorded is formed on an upper surface (Z direction) of the image forming apparatus 1.

The control device 10 includes an image forming apparatus controller 11 which controls an operation of the image forming apparatus 1, a controller 12 which is provided with image data which corresponds to a printing processing requirement, an exposure controller 13 which controls light of an exposure head LH, and a power source device 14. The power source device 14 applies voltage to a charging roller 32, a developing roller 42, a primary transfer roller 52, and a power supply roller 54 which will be described later, and supplies power to the exposure head LH, the sheet feeding device 20, the fixing device 60, and each of the provided sensors.

The controller 12 converts printing information input from an external information sending apparatus (for example, personal computer) to image information for forming a latent image, and at a timing set in advance, outputs a driving signal to the exposure head LH. The exposure head LH of the exemplary embodiment includes an LED head in which plural light emitting diodes (LED) are arranged in a main scanning direction.

The sheet feeding device 20 is provided in a bottom portion of the image forming apparatus 1. The sheet feeding device 20 is provided with a paper loading plate 21, and loads multiple paper sheets P as recording mediums on an upper surface of the paper loading plate 21. After drawing out the paper sheets P which are loaded on the paper loading plate 21, and of which the position in the width direction is determined by a regulating plate (not illustrated), forward (−X direction) by a paper drawing portion 22 one by one from the upper side, the paper sheets P are transported to a nip portion of a resist roller pair 23.

The photoreceptor member units 30 are respectively aligned above (Z direction) the sheet feeding device 20, and a photoreceptor drum 31 is provided as an image holding member which is driven to rotate. Along the rotational direction of the photoreceptor drum 31, the charging roller 32, the exposure head LH, the developing unit 40, the primary transfer roller 52, and a cleaning blade 34 are disposed. A cleaning roller 33 which cleans a front surface of the charging roller 32 is disposed to oppose and be in contact with the charging roller 32.

The developing unit 40 includes a developing housing 41 having developer accommodated therein. In the developing housing 41, the developing roller 42 which is disposed to oppose the photoreceptor drum 31, and one pair of augers 44 and 45 which stir and transport the developer to the developing roller 42 side obliquely below a rear surface side of the developing roller 42, are installed. A layer regulating member 46 which regulates a layer thickness of the developer is disposed to be close to the developing roller 42.

Each of the developing units 40 is similarly configured except for the developer accommodated in the developing housing 41, and each of the developing units 40 forms toner images of yellow (Y), magenta (M), cyan (C), and black (K).

A front surface of the rotating photoreceptor drum 31 is charged by the charging roller 32, and an electrostatic latent image is formed by latent image forming light emitted from the exposure head LH. The electrostatic latent image formed on the photoreceptor drum 31 is developed as a toner image by the developing roller 42.

The transfer unit 50 is provided with an intermediate transfer belt 51 which multiply transfers the toner images of each color formed on the photoreceptor drum 31 of each photoreceptor member unit 30, and the primary transfer roller 52 which consecutively transfers (primarily transfers) the toner images of each color formed by each photoreceptor member unit 30 to the intermediate transfer belt 51. Furthermore, a secondary transfer roller 53 which is an example of a transfer unit which integrally transfers (secondarily transfers) the toner images of each color transferred being superimposed on the intermediate transfer belt 51 to the paper sheet P, and the power supply roller 54 which is an example of a power supply member that supplies a secondary transfer bias to the secondary transfer roller 53, are provided.

The toner images of each color formed on the photoreceptor drum 31 of each photoreceptor member unit 30 are consecutively electrostatically transferred (primarily transferred) onto the intermediate transfer belt 51 by the primary transfer roller 52 to which predetermined transfer voltage is applied from the power source device 14 or the like controlled by the image forming apparatus controller 11, and a superimposed toner image obtained by superimposing toner of each color is formed.

The superimposed toner image on the intermediate transfer belt 51 is transported to a region (secondary transfer portion T) in which the secondary transfer roller 53 is disposed according to the movement of the intermediate transfer belt 51. When the superimposed toner image is transported to the secondary transfer portion T, the paper sheet P is fed to the secondary transfer portion T from the sheet feeding device 20 in accordance with the timing. In addition, the predetermined transfer voltage is applied from the power source device 14 or the like controlled by the image forming apparatus controller 11 to the power supply roller 54, and multiple toner images on the intermediate transfer belt 51 are integrally transferred to the paper sheet P which is sent out from the resist roller pair 23 and guided by a transporting guide.

Residual toner on the front surface of the photoreceptor drum 31 is removed by the cleaning blade 34, and collected in waste developer accommodating unit. The front surface of the photoreceptor drum 31 is recharged by the charging roller 32. Furthermore, residues which are not removed by the cleaning blade 34 and adhered to the charging roller 32, are captured and accumulated on the front surface of the cleaning roller 33 which rotates being in contact with the charging roller 32.

The fixing device 60 includes a fixing unit 600, a transporting roller pair 68, and an output roller pair 69. The fixing unit 600 has a heating module 61 and a pressure module 62, and a fixing nip portion N (fixing region) is formed by a press-contact region of the heating module 61 and the pressure module 62.

The paper sheet P to which the toner image is transferred in the transfer unit 50 is transported to the fixing device 60 via a transporting guide in a state in which the toner image is unfixed. On the paper sheet P transported to the fixing device 60, the toner image is fixed by an action of press-bonding and heating by one pair of heating module 61 and pressure module 62.

The paper sheet P on which the fixed toner image is formed is output to the output tray 1a on the upper surface of the image forming apparatus 1 from the output roller pair 69 via the transporting roller pair 68.

(2) Driving Force Transmission Device

Figure 2:
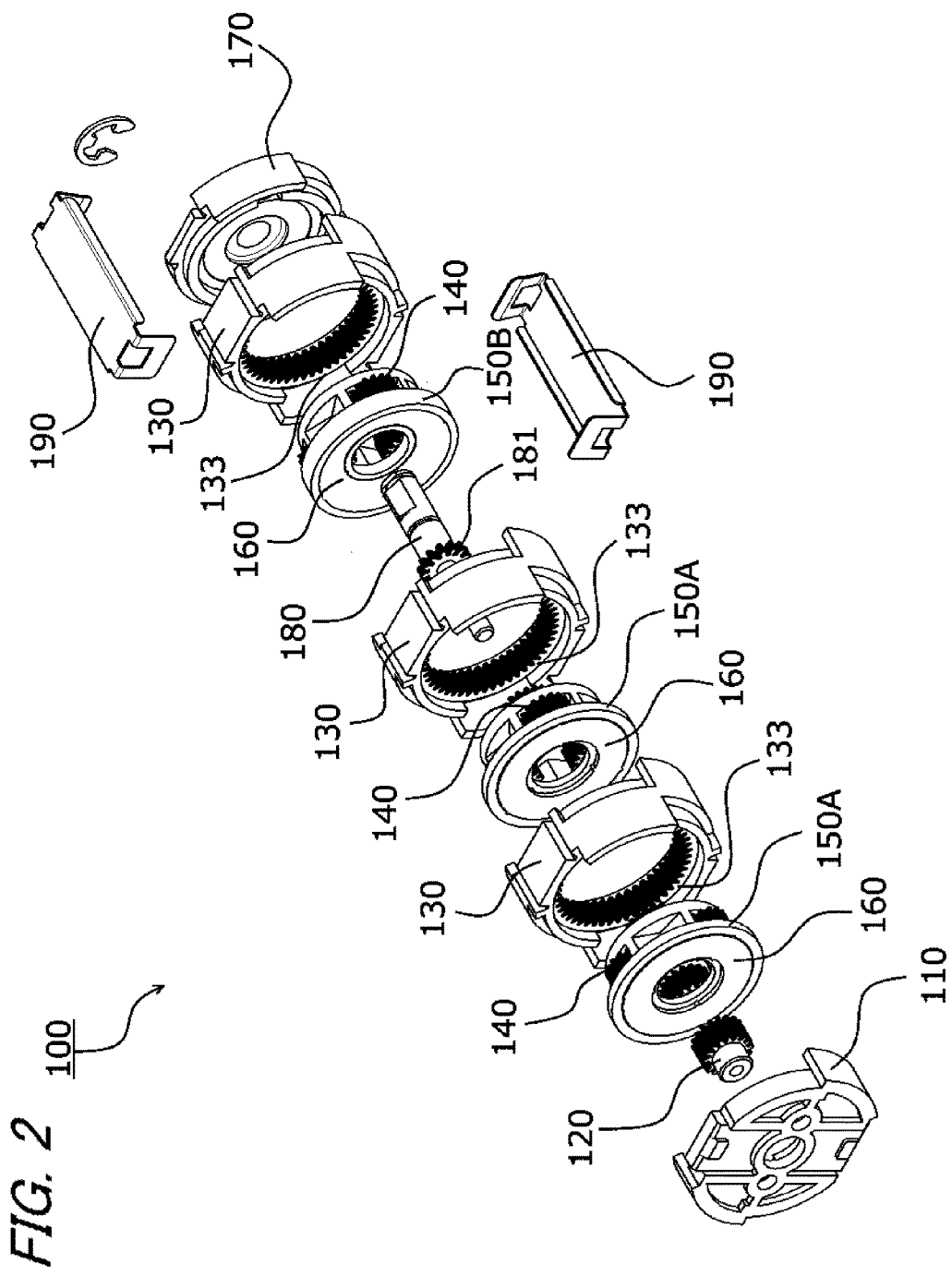
FIG. 2 is an exploded perspective view illustrating an example of a driving force transmission device.
Figure 3A:
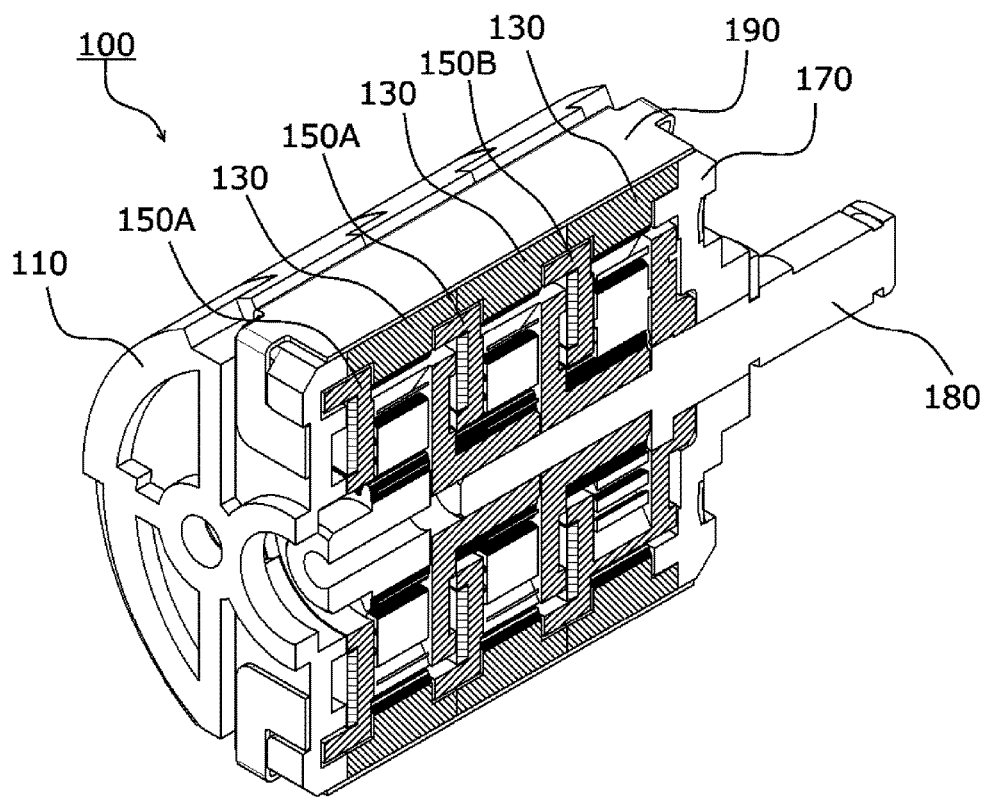
FIG. 3A is a partially sectional perspective view illustrating an example of the driving force transmission device.
Figure 3B:
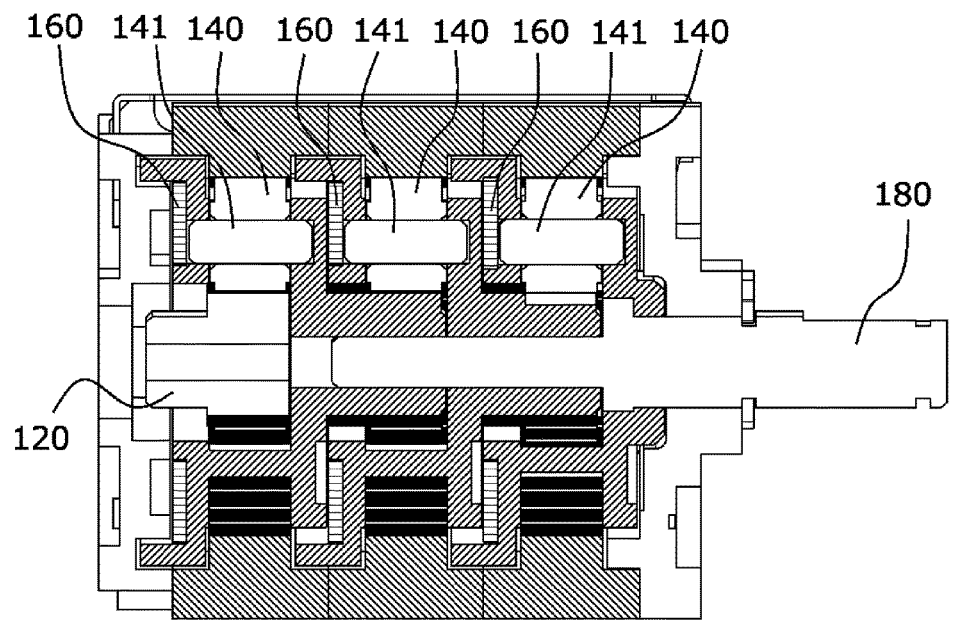
FIG. 3B is a longitudinal sectional view of the driving force transmission device.
Figure 4A:
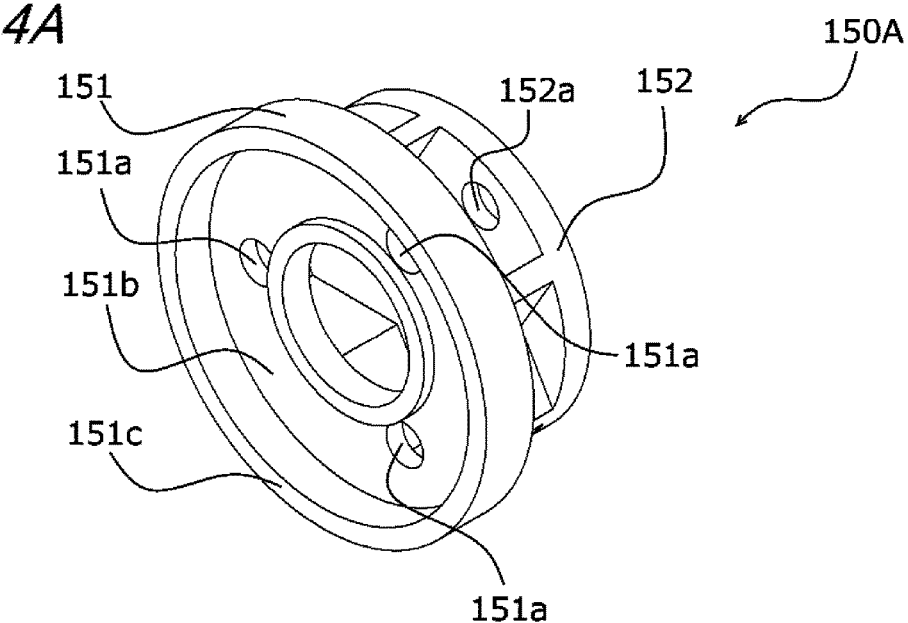
FIG. 4A is a perspective view from the viewpoint of a first disc portion side of a first carrier 150A.
Figure 4B:
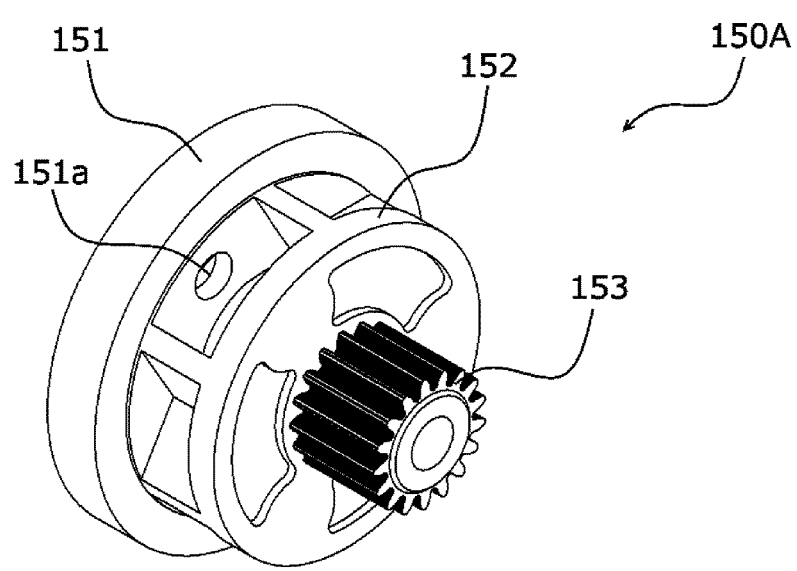
FIG. 4B is a perspective view from the viewpoint of external teeth side.
Figure 5A:
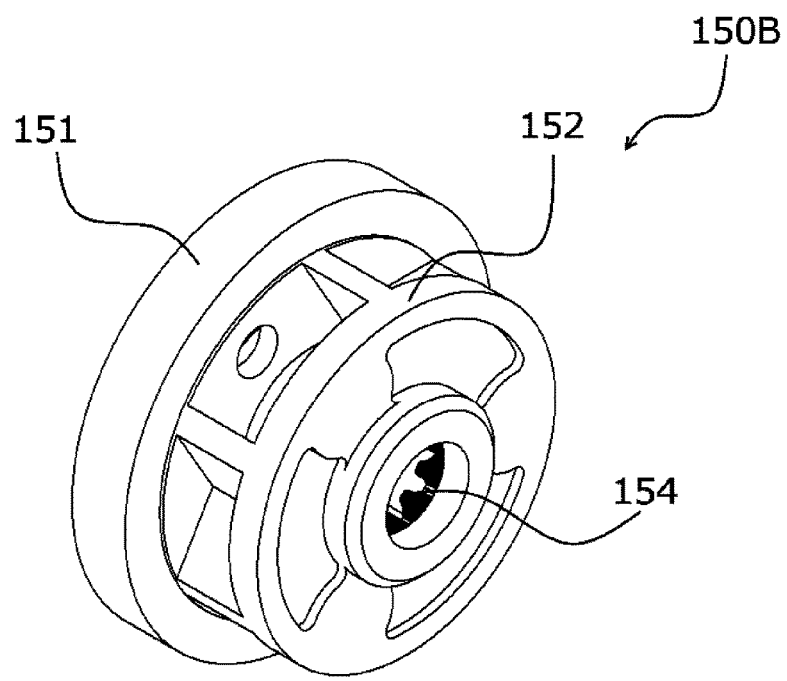
FIG. 5A is a perspective view from the viewpoint of a second disc portion side of a second carrier.
Figure 5B:
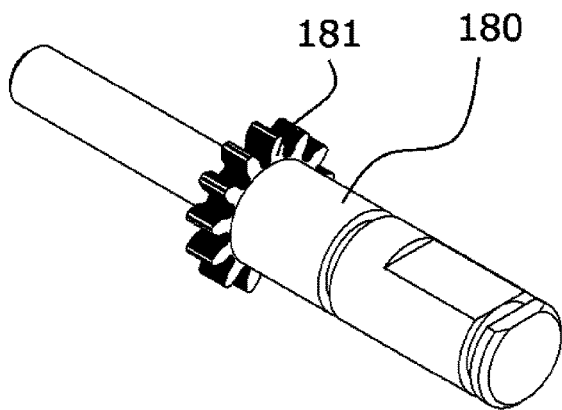
FIG. 5B is a perspective view of an output shaft.
Figure 6A:
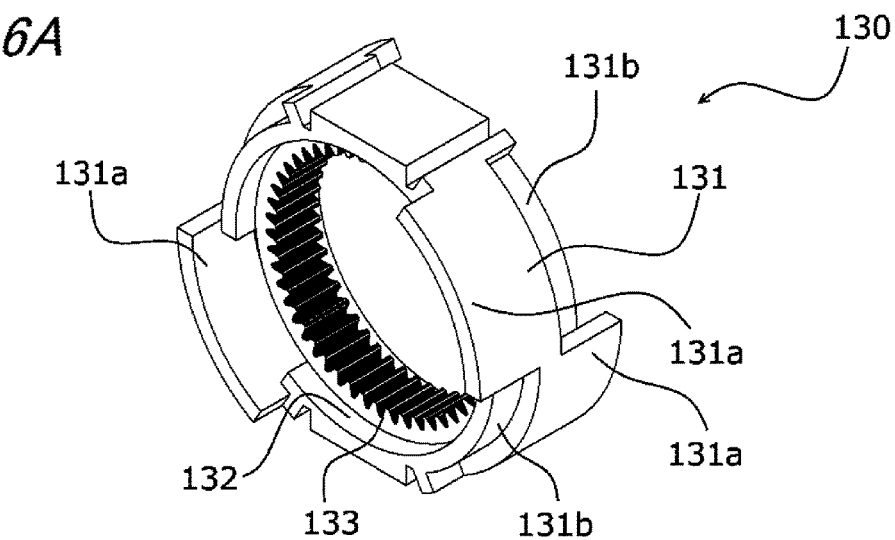
FIGS. 6A and 6B are perspective views of an internal gear.
Figure 6B:
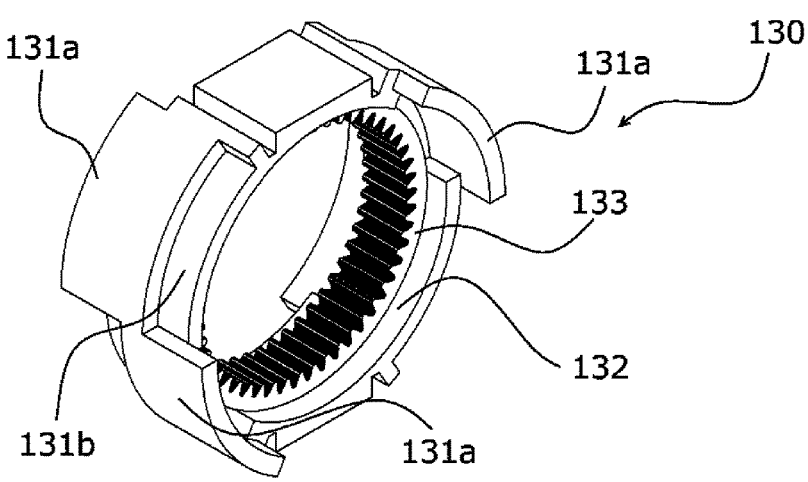
Figure 7A:
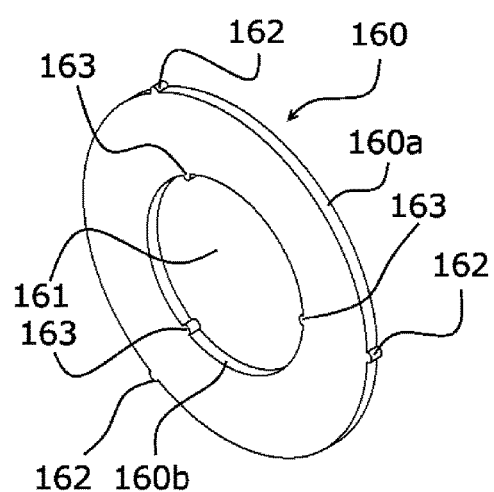
FIG. 7A is a perspective view of a retaining member.
Figure 7B:
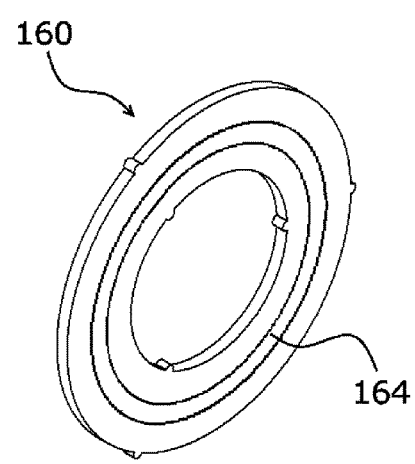
FIG. 7B is a perspective view from the viewpoint of a side on which the retaining member contacts with a rotating shaft.
Figure 7C:
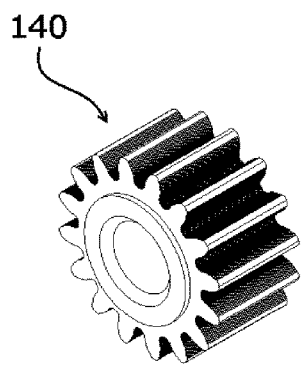
FIG. 7C is a perspective view of a planetary gear.
Figure 7D:
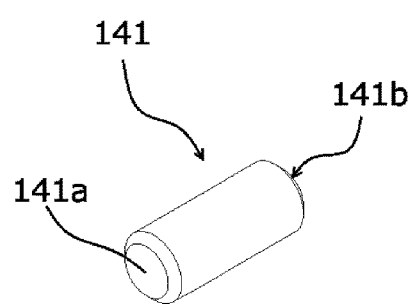
FIG. 7D is a perspective view of the rotating shaft.
Figure 8A:
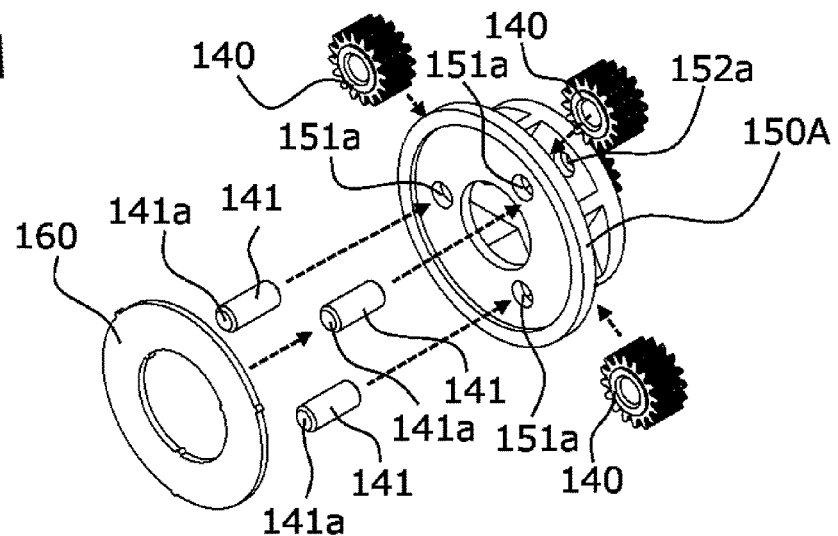
FIGS. 8A and 8B are perspective views illustrating assembly of the planetary gear to the first carrier.
Figure 8B:
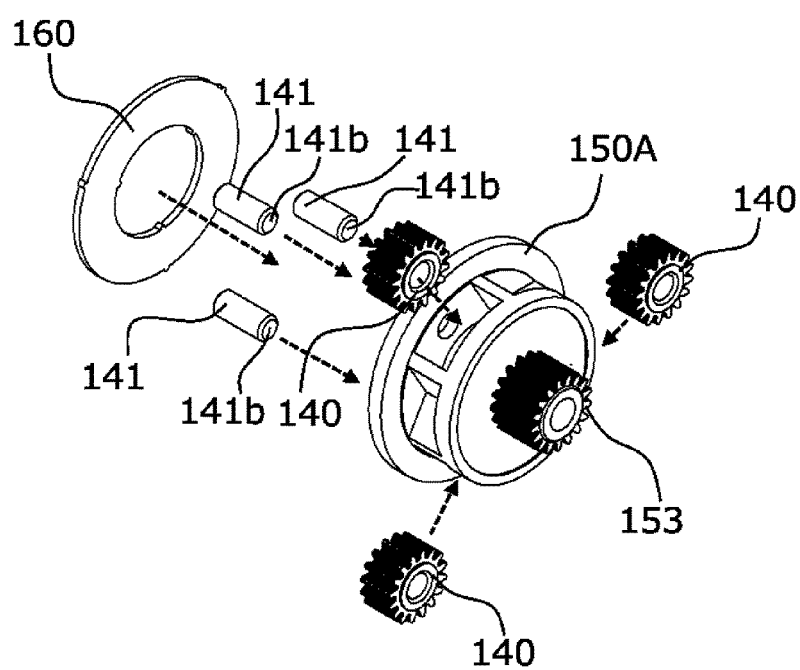

FIG. 2 is an exploded perspective view illustrating an example of a driving force transmission device 100 having a planetary gear mechanism. FIG. 3A is a partially sectional perspective view illustrating an example of the driving force transmission device 100, FIG. 3B is a longitudinal sectional view, FIG. 4A is a perspective view from the viewpoint of a first disc portion 151 side of a first carrier 150A, FIG. 4B is a perspective view from the viewpoint of external teeth 153 side, FIG. 5A is a perspective view from the viewpoint of a second disc portion 152 side of a second carrier 150B, FIG. 5B is a perspective view of an output shaft 180, FIG. 6 is a perspective view of an internal gear 130, FIG. 7A is a perspective view of a retaining member 160, FIG. 7B is a perspective view from the viewpoint of a side on which the retaining member 160 contacts with a rotating shaft 141, FIG. 7C is a perspective view of a planetary gear 140, FIG. 7D is a perspective view of the rotating shaft 141, and FIGS. 8A and 8B are perspective views illustrating assembly of the planetary gear 140 to the first carrier 150A.

Hereinafter, a configuration and an operation of the driving force transmission device 100 will be described with reference to the drawings.

(2.1) Entire Configuration of Driving Force Transmission Device

FIG. 2 illustrates an example of the driving force transmission device 100 configured as the three-stage planetary gear mechanisms. However, the driving force transmission device 100 according to the exemplary embodiment may be configured by stacking multiple-stage planetary gear mechanisms in accordance with a required deceleration ratio.

As illustrated in FIGS. 3A and 3B, the driving force transmission device 100 includes a first support lid 110, a sun gear 120 which rotates receiving a driving force from a driving source, the internal gear 130 disposed coaxially with the sun gear 120, the plural planetary gears 140 which revolve while meshing with the sun gear 120 and the internal gear 130 and rotating, a carrier 150 which supports the rotating shaft 141 of the planetary gear 140, and serves as a rotating member which rotates about the output shaft 180 as the planetary gear 140 revolves, the retaining member 160 which contacts with one end 141a of the rotating shaft 141 of the planetary gear 140 on one surface side of the carrier 150 to retain the rotating shaft 141, a second support lid 170, and a linking member 190 which holds a plurality of planetary gear mechanisms in a stacked manner between the first support lid 110 and the second support lid 170.

(2.2) Sun Gear

The sun gear 120 is fixed to the output shaft of a motor M (not illustrated) which is a driving source, and transmits the driving force of the motor M to the planetary gear 140.

(2.3) Carrier

As illustrated in FIGS. 4A and 4B, the carrier 150 which is an example of the fixing member includes the first disc portion 151, the second disc portion 152 which faces the first disc portion 151, the first carrier 150A (refer to FIGS. 4A and 4B) in which the external teeth 153 that protrudes in the direction of a rotation axis from the second disc portion 152 are integrally formed, and the second carrier 150B (refer to FIG. 5A) in which internal teeth 154 are integrally formed on the inner side of the second disc portion 152.

In a case in which the driving force transmission device 100 is configured to have multiple planetary gear mechanisms in a stacked manner, the carrier first carrier 150A is used other than in the final stage on the output side, and rotates the planetary gear 140 as the external teeth 153 mesh with the planetary gear 140 of the adjacent planetary gear mechanism.

The second carrier 150B is used in the final stage on the output side, and transmits the decelerated rotation from the driving source to the output shaft 180 of the driving force transmission device 100 as the internal teeth 154 meshes with external teeth 181 of the output shaft 180.

As illustrated in FIGS. 4A and 4B, a bottomed hole 152*a* is formed in the second disc portion 152, and a through hole 151*a* is formed in the first disc portion 151. In the exemplary embodiment, one pair of holes 152*a* and the through hole 151*a* are respectively provided at three locations in accordance with the planetary gear 140, and support the planetary gear 140 to be freely rotated in a circumferential edge portion of the carrier 150 as the rotating shaft 141 which supports the planetary gear 140 to be rotated is inserted into the through hole 151*a* and the other end 141*b* is fitted to the hole 152*a*.

Compare to the second disc portion 152, the first disc portion 151 has a shape of a disk having a large diameter, an annular recessed portion 151*b* is formed on the front surface thereof, and projection portions 162 and 163 in which the retaining member 160 which will be described later is formed in the circumferential edge portion are fixed to one surface side of the carrier 150 in a state of being fitted to the recessed portion 151*b*. The retaining member 160 contacts with the one end 141*a* of the rotating shaft 141 supported by the through hole 151*a* of the first disc portion 151 and the hole 152*a* of the second disc portion 152, and retains the rotating shaft 141.

A flange portion 151*c* is formed in the circumferential edge portion of the first disc portion 151. The flange portion 151*c* is formed to protrude from an end surface of the internal gear 130 in the axial direction of the rotating shaft 141.

As a result, in a state in which the multiple planetary gear mechanisms are arranged in a stacked manner, the flange portion 151*c* is positioned on inner surfaces 132 both of the internal gears 130 that are adjacent to each other, and suppresses a displacement of axes of the stacked planetary gear mechanisms in the event that the internal gear 130 receives an external force in the direction (e.g., the vertical direction) intersecting the rotation axis.

The second disc portion 152 has a diameter which is smaller than that of a tooth tip circle of internal teeth 133 of the internal gear 130, and in a state in which the planetary gear 140 is embedded therein, the second disc portion 152 is inserted into the output shaft 180 and the planetary gear 140 meshes with the internal teeth 133 formed on the inner surface 132 of a hollow portion of the internal gear 130.

(2.4) Internal Gear

As illustrated in FIGS. 5A and 5B, the internal gear 130 includes a tube member 131 of which the entire shape is a cylinder having a hollow portion, and internal teeth 133 formed in the center portion on the inner surface 132 of the tube member 131.

Both sides of the inner surface 132 on which the internal teeth 133 are formed have a cylindrical shape, and the flange portion 151*c* of the first disc portion 151 of the carrier 150 abuts against one end side, and supports the carrier 150 to be rotated from the outside.

In the tube member 131, in a case where a projected portion 131*a* which protrudes in the direction of the axis of an input shaft, and a recessed portion 131*b* which is fitted to the projected portion 131*a* are formed and configured by stacking multiple stages, the projected portion 131*a* and the recessed portion 131*b* are fitted to each other, and the planetary gear mechanisms coaxially overlap each other.

(2.5) Retaining Member

As illustrated in FIG. 7A, the retaining member 160 is a ring-like plate member having a center hole 161, and the projection portions 162 and 163 which are a plurality engaging portions are formed in outer edge portion 160*a* and an inner edge portion 160*b*.

The retaining member 160 is fixed to one surface side of the carrier 150 in a state in which the projection portions 162 and 163 are pressed and fitted to the annular recessed portion 151*b* formed in the first disc portion 151, in a state in which the planetary gear 140 is supported to be freely rotated via the rotating shaft 141 in the carrier 150.

As a result, the retaining member 160 contacts with the one end 141*a* of the rotating shaft 141 supported by the through hole 151*a* of the first disc portion 151 and the hole 152*a* of the second disc portion 152, and retains the rotating shaft 141.

As illustrated in FIG. 7B, a groove 164 is formed on a sliding surface which contacts with the one end 141*a* of the rotating shaft 141 of the retaining member 160. Lubricant is interposed between the groove 164 and the one end 141*a* of the rotating shaft 141 abutting thereagainst, to thereby improve rotating slidability of the rotating shaft 141.

(2.6) Materials

The first support lid 110, the sun gear 120, the internal gear 130, the planetary gear 140, the carrier 150, and the second support lid 170 are configured with molded articles containing a synthetic resin material. Examples of the synthetic resin material include polyacetal (POM), polyamid (PA), polycarbonate (PC), polyethylene terephthalate (PET), polyphenylene sulfide (PPS), liquid crystal polymer (LCP), and a reinforced synthetic resin obtained by adding glass fibers or carbon fibers into the synthetic resin.

The retaining member 160 is molded by using a material having higher slidability than that of the synthetic resin or the reinforced synthetic resin which is a material of the carrier 150. Specifically, polyacetal (POM) having high slidability in which wear resistance and slidability are further improved in addition to the properties of general polyacetal (POM), can be used.

In addition, as a material of the retaining member 160, metal can be used. Specifically, a stainless steel material can be used.

In a case where the sliding materials or metal are used as a material of the retaining member 160, and in a case where the multiple stages are stacked, it is possible to improve rotating slidability with respect to the rotating carrier 150 which rotates together with the retaining member 160.

(2.8) Operation

The sun gear 120 rotates as the motor M is driven. In addition, when the sun gear 120 rotates, each of three planetary gears 140 rotates about the rotating shaft 141. In addition, since each of three planetary gears 140 meshes with the internal teeth 133 of the internal gear 130, each of three planetary gears 140 revolves along the internal gear 130.

In addition, when three planetary gears 140 start to revolve, the first carrier 150A which supports the planetary gear 140 starts to decelerate and rotate with respect to the rotation of the sun gear 120. When the first carrier 150A starts to decelerate and rotate, the external teeth 153 formed to be integrated with the first carrier 150A starts to decelerate and rotate.

In a case in which the planetary gear mechanisms are stacked on one another as illustrated in FIGS. 3A and 3B (3 planetary gear mechanisms in the example of FIGS. 3A and 3B), the external teeth 153 provided on the outer surface of the second disc portion 152 of the first carrier 150A to rotate in a decelerated manner serves as an input of the second planetary gear mechanism.

In addition, in the second planetary gear mechanism, the second planetary gear 140 meshed with the second internal gear 130 and the external teeth 153 is supported by the second first carrier 150A and rotates and revolves on the outer circumference of the external teeth 153. In addition, the second first carrier 150A supporting the revolving planetary gear 140 rotates in a decelerated manner.

The external teeth 153 is provided on the outer surface of the second disc portion 152 of the second first carrier 150A that rotates in a decelerated manner, and the third planetary gear 140 meshed with the third internal gear 130 and the third external teeth 153 is supported by the second carrier 150B and rotates and revolves on the outer circumference of the external teeth 153. The internal teeth 154 formed on the inner side of the second disc portion 152 of the third second carrier 150B supporting the revolving planetary gear 140 meshes with the external teeth 181 of the output shaft 180, and the rotation that has been decelerated in three stages is transmitted to the output shaft 180 of the driving force transmission device 100.

(3) Driving Device Using Driving Force Transmission Device

The driving force transmission device 100 having the stacked planetary gear mechanisms is used such that one of the rotation of the sun gear 120, the revolution of the planetary gear 140 (rotation of the carrier 150), and the rotation of the internal gear 130 is fixed, one of the remaining two is connected to an input, and the other of the remaining two is connected to an output.

EXAMPLE 1

Figure 9:
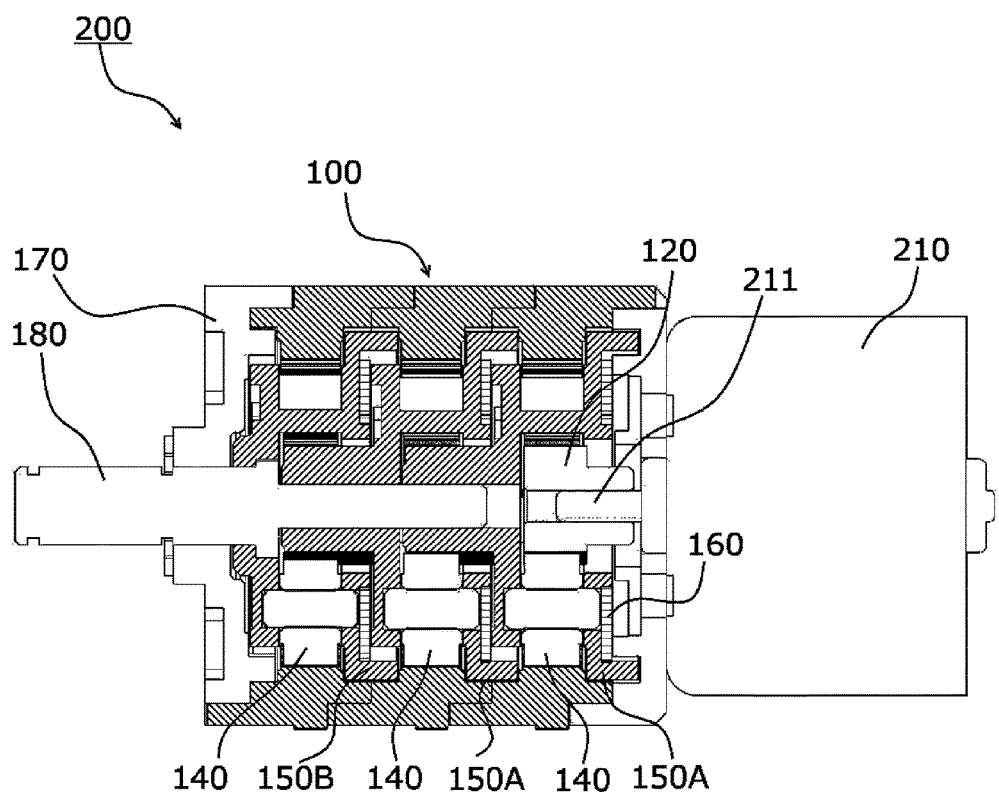
FIG. 9 is a partially sectional perspective view of a geared motor according to Example 1.

FIG. 9 is a schematic longitudinal sectional view of a geared motor 200 according to the example.

The geared motor 200 is provided with a decelerator, and includes a motor 210 serving as a driving source fixed to a first support lid 110 and a driving force transmission device 100, the driving force transmission device 100 including a sun gear 120 inserted into an output shaft 211 of the motor 210, and three planetary gear mechanisms arranged in a stacked manner and integrated by the second support lid 170, each of the planetary gear mechanisms including a carrier 150 which rotates and supports the planetary gear 140, and an internal gear 130 which meshes with the planetary gear 140.

In the geared motor 200, the rotation driving force of the motor 210 is transmitted to the sun gear 120 from the output shaft 211, and is decelerated and output from the output shaft 180 of the driving force transmission device 100. In the geared motor 200, the motor 210 which is a driving source is integrally connected to the sun gear 120 of the driving force transmission device 100, and can be used as a driving device which suppresses rotation unevenness or lock.

EXAMPLE 2

Figure 10:
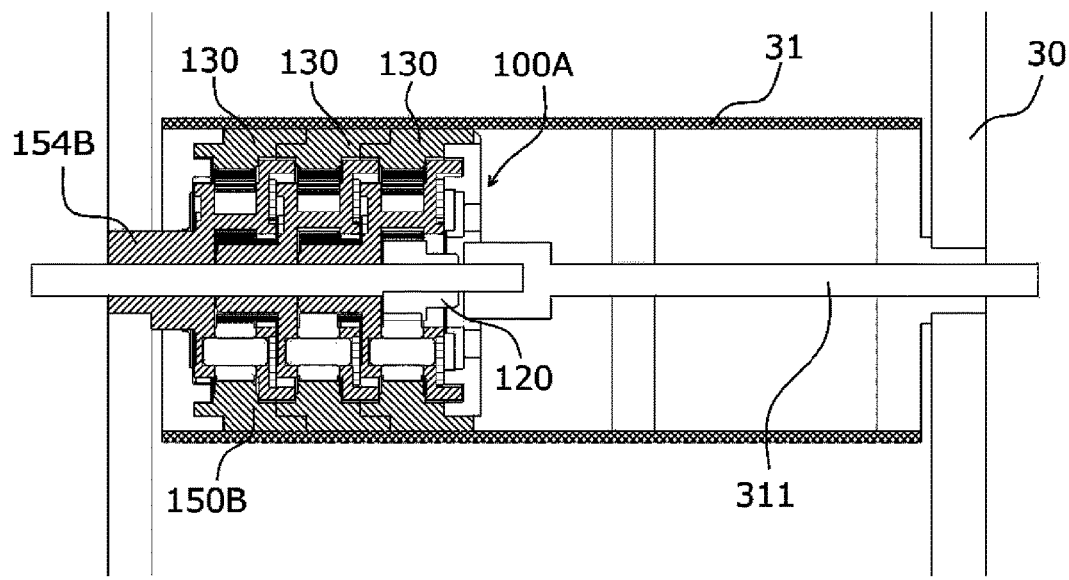
FIG. 10 is a schematic longitudinal sectional view of a photoreceptor drum in which a driving force transmission device according to Example 2 is provided.

FIG. 10 is a schematic longitudinal sectional view of a photoreceptor drum 31 according to the example.

In a driving force transmission device 100A, the tube member 131 of the internal gear 130 is fitted into the photoreceptor drum 31, and the sun gear 120 is connected to the motor M (not illustrated) which is a driving source via a drum shaft 311.

The driving force from the motor M which is a driving source is transmitted to the driving force transmission device 100A via the drum shaft 311, and the rotation driving force input from the sun gear 120 is decelerated by the three-stage planetary gear mechanism.

In the driving force transmission device 100A, the internal gear 130 rotates in a state in which an output shaft 154B of the second carrier 150B is fixed to the photoreceptor member units 30, and the rotation driving is transmitted to the photoreceptor drum 31 fixed to the tube member 131 of the internal gear 130 together with the decelerated rotation of the internal gear 130 while the rotation unevenness is suppressed.

EXAMPLE 3

Figure 11A:
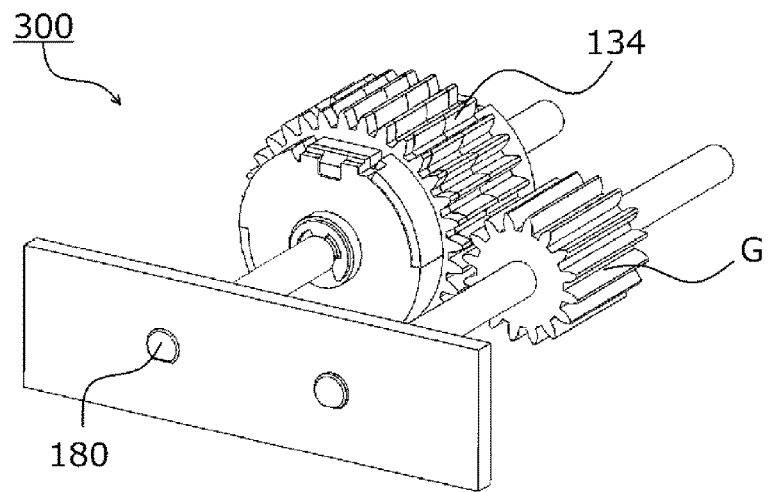
FIG. 11A is a perspective view of an external teeth decelerating mechanism 300 according to Example 3.
Figure 11B:
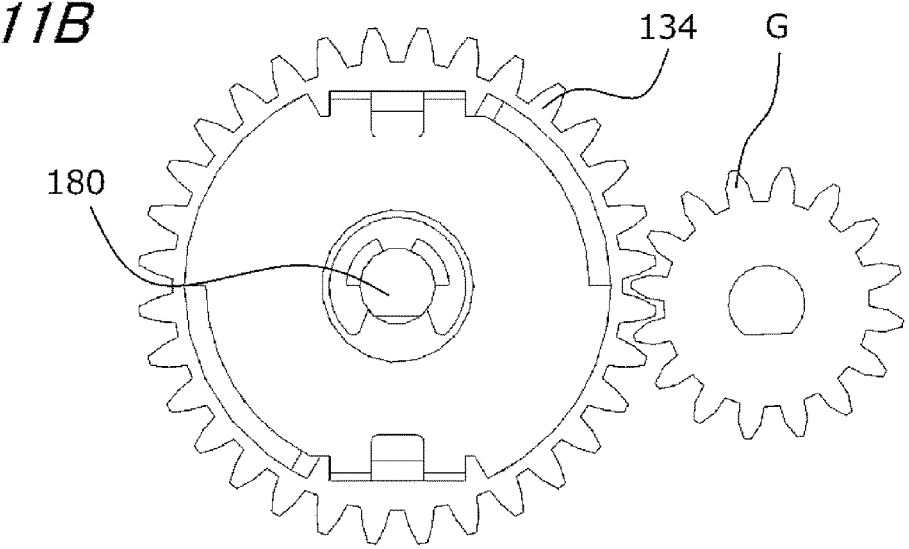
FIG. 11B is a front view of the external teeth decelerating mechanism according to Example 3.

FIG. 11A is a perspective view of an external teeth decelerating mechanism 300 according to the example, and FIG. 11B is a front view.

In the external teeth decelerating mechanism 300, the internal gear 130 which configures a driving force transmission device 100B includes external teeth 134 on the outer surface of the tube member 131, and transmits the acceleration rotation to a driven member G which meshes with the external teeth 134.

In the external teeth decelerating mechanism 300, the rotation driving force input from the sun gear 120 is decelerated by the planetary gear mechanism, the internal gear 130 rotates in a state in which the output shaft 180 is fixed, and the rotation driving force is transmitted to a gear 135 which meshes with the external teeth 134 provided on the outer surface of the internal gear 130 together with the decelerated rotation of the internal gear 130.

EXAMPLE 4

Figure 12:
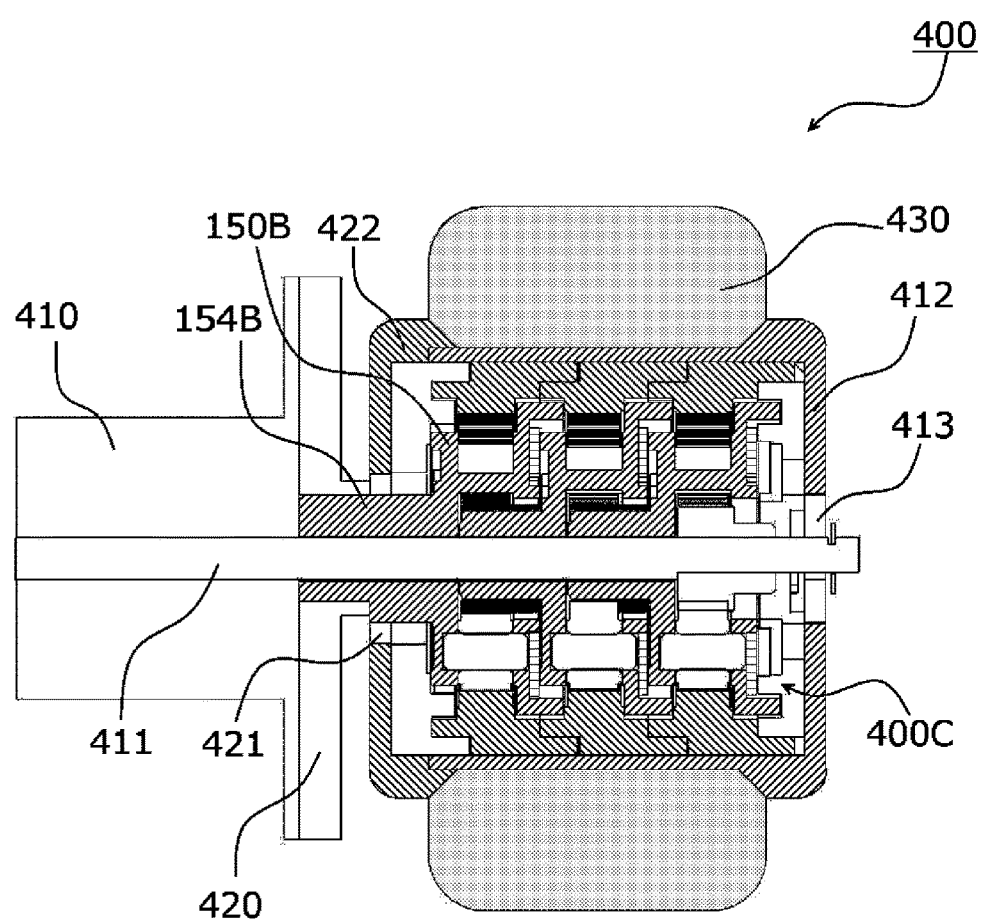
FIG. 12 is a schematic longitudinal sectional view of an in-wheel mechanism according to Example 4.

FIG. 12 is a schematic longitudinal sectional view of an in-wheel mechanism 400.

In the in-wheel mechanism 400, a driving force transmission device 100C is inserted into an output shaft 411 of a motor 410 which is a driving source, and is fixed to an inner surface of a wheel 412. The wheel 412 is supported to rotate via a bearing 413 with respect to the output shaft 411 of a motor 410, and a wheel 422 is supported to rotate via a bearing 421 opposing the wheel 412 on the outer circumferential surface of the output shaft 154B of the second carrier 150B fixed to a holding member 420 of the motor 410.

In the in-wheel mechanism 400 configured in this manner, the rotation driving of the motor 410 is decelerated by the three-stage driving force transmission device 100C, and is transmitted to the wheels 412 and 422 fixed to the outer surface of the internal gear 130 while the rotation unevenness is suppressed.

A roll member 430 made of rubber can be mounted in the wheels 412 and 422, for example.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A planetary gear mechanism comprising:
a sun gear that rotates upon receipt of a driving force via an input shaft;
an internal gear that has a tube member and internal teeth on an inner surface of the tube member, the internal gear being disposed coaxially with the sun gear;
a planetary gear that rotates and revolves in mesh with the sun gear and the internal gear;
a first disc portion that supports a shaft of the planetary gear, has a circumferential edge portion that abuts against the inner surface of the tube member such that the first disc portion is supported in a rotatable manner, and rotates about the input shaft as the planetary gear revolves; and
a second disc portion that faces the first disc portion, the first disc portion and the second disc portion being integrally formed,
wherein one of the first disc portion and a second disc portion comprises a bottomed hole,
wherein the other of the first disc portion and the second disc portion comprises a through hole, and
wherein the shaft of the planetary gear inserted into the through hole is supported by the through hole and the bottomed hole.

2. The planetary gear mechanism according to claim 1, wherein the first disc portion comprises an annular recessed portion to which an engaging projection of a retaining member is fitted so that the retaining member is fixed to one surface side to retain the rotating shaft, the engaging projection being provided at a circumferential edge portion of the retaining member.

3. The planetary gear mechanism according to claim 1, wherein the first disc portion comprises a flange portion at a circumferential edge portion of the first disc portion, the flange portion being formed to protrude from an end surface of the internal gear in an axial direction of the shaft of the planetary gear, and
wherein, in a state in which a plurality of planetary gear mechanisms are stacked, each of the planetary gear mechanisms including the internal gear, the planetary gear and the first disc portion, the flange portion is positioned on inner surfaces of the adjacent internal gears.

4. A driving force transmission device comprising:
a sun gear that rotates upon receipt of a driving force;
an internal gear that has a hollow portion and internal teeth on an inner surface of the hollow portion, the internal gear being disposed coaxially with the sun gear;
a planetary gear that rotates and revolves in mesh with the sun gear and the internal gear;
a first disc portion that supports a rotating shaft of the planetary gear, and rotates about an output shaft as the planetary gear revolves; and
a retaining member that contacts one end of the rotating shaft of the planetary gear on one surface side of the first disc portion to retain the rotating shaft,
wherein the retaining member is a round plate member having a center hole, and the retaining member has a round groove around the center hole on a sliding surface which contacts with the one end of the rotating shaft.

5. The driving force transmission device according to claim 4, further comprising a second disc portion that faces the first disc portion, the first disc portion and the second disc portion being integrally formed,
wherein one of the first disc portion and a second disc portion comprises a bottomed hole,
wherein the other of the first disc portion and the second disc portion comprises a through hole, and
wherein the rotating shaft inserted into the through hole is supported by the through hole and the bottomed hole.

6. The driving force transmission device according to claim 5, wherein the first disc portion comprises an annular recessed portion, and
wherein the retaining member comprises an engaging projection at a circumferential edge portion of the retaining member, the retaining member being fixed to the one surface side of the first disc portion in a state in which the engaging projection is fitted to the recessed portion.

7. The driving force transmission device according to claim 4, wherein the first disc portion comprises a flange portion at a circumferential edge portion of the first disc portion, the flange portion being formed to protrude from an end surface of the internal gear in an axial direction of the rotating shaft, and
wherein, in a state in which a plurality of planetary gear mechanisms are stacked, each of the planetary gear mechanisms including the internal gear, the planetary gear and the rotating member, the flange portion is positioned on inner surfaces of the adjacent internal gears.

8. The driving force transmission device according to claim 4, wherein the retaining member is made of a sliding material on the sliding surface, the sliding material having higher slidability than the rotating member.

9. The driving force transmission device according to claim 4, wherein the retaining member is made of a metal or a resin material.

10. The driving force transmission device according to claim 4, wherein the round groove is configured to provide a lubricant between the retaining member and the one end of the rotating shaft.

11. An image forming apparatus comprising:
a motor that rotates the sun gear of the driving force transmission device according to claim 4;

an output shaft that transmits a rotating force of the first disc portion of the driving force transmission device; and an image forming unit that is driven by the output shaft to form an image.

* * * * *